(12) United States Patent
Chen et al.

(10) Patent No.: US 11,765,220 B2
(45) Date of Patent: Sep. 19, 2023

(54) METHOD, SYSTEM, AND COMPUTER PROGRAM PRODUCT FOR STREAMING

(71) Applicant: EMC IP Holding Company LLC, Hopkinton, MA (US)

(72) Inventors: Qiang Chen, Shanghai (CN); Pedro Fernandez Orellana, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/520,908

(22) Filed: Nov. 8, 2021

(65) Prior Publication Data
US 2023/0131141 A1 Apr. 27, 2023

(30) Foreign Application Priority Data
Oct. 21, 2021 (CN) .......................... 202111228331.7

(51) Int. Cl.
*G06F 13/00* (2006.01)
*H04L 65/80* (2022.01)
*H04L 65/61* (2022.01)
*H04L 65/75* (2022.01)

(52) U.S. Cl.
CPC .............. *H04L 65/80* (2013.01); *H04L 65/61* (2022.05); *H04L 65/764* (2022.05)

(58) Field of Classification Search
CPC ........ H04L 65/80; H04L 65/61; H04L 65/764
USPC ................. 709/231, 217–219, 221, 224, 232
See application file for complete search history.

(56) References Cited

U.S. PATENT DOCUMENTS

| | | | |
|---|---|---|---|
| 8,510,763 B2* | 8/2013 | Fatehpuria | G06F 9/50 719/329 |
| 10,264,046 B2* | 4/2019 | Glynn | H04N 21/8455 |
| 10,574,719 B2* | 2/2020 | O'Connell | H04L 65/70 |
| 10,621,695 B2* | 4/2020 | Schroers | G06T 3/4007 |
| 2007/0024705 A1* | 2/2007 | Richter | H04N 21/6587 348/E7.086 |
| 2007/0024706 A1* | 2/2007 | Brannon, Jr. | H04N 21/6587 348/E7.071 |
| 2011/0307900 A1* | 12/2011 | Fatehpuria | G06F 9/50 718/104 |

(Continued)

OTHER PUBLICATIONS

Wikipedia, "Google Stadia," https://en.wikipedia.org/wiki/Google_Stadia, Aug. 11, 2021, 15 pages.

(Continued)

*Primary Examiner* — Kenneth R Coulter
(74) *Attorney, Agent, or Firm* — Ryan, Mason & Lewis, LLP (57) ABSTRACT

Embodiments of the present disclosure relate to a method, a system, and a computer program product for streaming. The method includes: acquiring, during transmission of a stream, information indicating resources of a receiver of the stream available for compensating for degradation of a transmission quality of the stream; and determining at least a target transmission quality of the stream based at least on the resources of the receiver and network resources available for transmitting the stream. This solution provides a more flexible adaptive balance mechanism for streaming, and further optimizes utilization of various resources and user experience in streaming.

20 Claims, 4 Drawing Sheets

(56) References Cited

U.S. PATENT DOCUMENTS

| | | | |
|---|---|---|---|
| 2015/0163273 A1* | 6/2015 | Radcliffe | H04L 43/0894 |
| | | | 709/231 |
| 2017/0302720 A1* | 10/2017 | Glynn | H04N 21/2343 |
| 2019/0130530 A1 | 5/2019 | Schroers et al. | |
| 2019/0158563 A1* | 5/2019 | O'Connell | H04L 65/61 |

OTHER PUBLICATIONS

Wikipedia, "Video Super Resolution," https://en.wikipedia.org/wiki/Video_Super_Resolution, Jun. 27, 2021, 18 pages.

Amazon Web Services, "AI Video Super Resolution," https://www.amazonaws.cn/en/solutions/ai-super-resolution-on-aws/, Feb. 2020, 6 pages.

Wikipedia, "GeForce Now," https://en.wikipedia.org/wiki/GeForce_Now, Jun. 6, 2021, 5 pages.

Wikipedia, "Xbox Cloud Gaming," https://en.wikipedia.org/wiki/Xbox_Cloud_Gaming, Aug. 9, 2021, 7 pages.

C. Faulkner, "Microsoft's xCloud game streaming is now widely available on iOS and PC," https://www.theverge.com/2021/6/28/22554267/microsoft-xcloud-game-streaming-xbox-pass-ios-iphone-ipad-pc, Jun. 28, 2021, 4 pages.

Wikipedia, "Nvidia Shield TV," https://en.wikipedia.org/wiki/Nvidia_Shield_TV, Jun. 24, 2021, 3 pages.

U.S. Appl. No. 17/400,350 filed in the name of Qiang Chen et al. on Aug. 12, 2021, and entitled "Method, Electronic Device, and Computer Program Product for Video Processing."

\* cited by examiner

METHOD, SYSTEM, AND COMPUTER PROGRAM PRODUCT FOR STREAMING

RELATED APPLICATION(S)

The present application claims priority to Chinese Patent Application No. 202111228331.7, filed Oct. 21, 2021, and entitled "Method, System, and Computer Program Product for Streaming," which is incorporated by reference herein in its entirety.

FIELD

Embodiments of the present disclosure relate to network transmission technologies, and in particular, to a method, a system, and a computer program product for streaming.

BACKGROUND

In streaming, it is often necessary to adjust the quality of a stream being transmitted to dynamically adapt to network conditions. Conventional methods of adjusting and adapting to network conditions automatically change a transmission quality of a stream (e.g., a transmission resolution of a dynamic video stream) based primarily on availability of network resources (such as bandwidths). According to the methods, when network conditions are poor, the quality of a stream received by a receiver may be reduced, and as a result, for example, the experience of a user using the stream at the receiver will be reduced. Therefore, there is a need for an optimized method to better balance utilization of various resources and user experience in streaming.

SUMMARY

An embodiment of the present disclosure provides a solution for streaming.

In a first aspect of the present disclosure, a method for streaming is provided. The method includes: acquiring, during transmission of a stream, information indicating resources of a receiver of the stream available for compensating for degradation of a transmission quality of the stream; and determining at least a target transmission quality of the stream based at least on the resources of the receiver and network resources available for transmitting the stream.

In a second aspect of the present disclosure, an electronic device is provided. The electronic device includes a processor and a memory that is coupled to the processor and has instructions stored therein. The instructions, when executed by the processor, cause the electronic device to execute actions including: acquiring, during transmission of a stream, information indicating resources of a receiver of the stream available for compensating for degradation of a transmission quality of the stream; and determining at least a target transmission quality of the stream based at least on the resources of the receiver and network resources available for transmitting the stream.

In a third aspect of the present disclosure, a computer program product is provided. The computer program product is tangibly stored on a computer-readable medium and includes machine-executable instructions. The machine-executable instructions, when executed, cause a machine to execute the method according to the first aspect of the present disclosure.

It should be noted that this Summary is provided to introduce a selection of concepts in a simplified manner, which will be further described in the Detailed Description below. The Summary is neither intended to identify key features or major features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent, where.

In all the drawings, the same or similar reference numerals represent the same or similar elements.

DETAILED DESCRIPTION

Embodiments of the present disclosure will be described in more detail below with reference to the accompanying drawings. Although some embodiments of the present disclosure are shown in the accompanying drawings, it should be understood that the present disclosure can be implemented in various forms and should not be construed as being limited to the embodiments set forth herein. On the contrary, these embodiments are provided for a more thorough and complete understanding of the present disclosure. It should be understood that the accompanying drawings and embodiments of the present disclosure are for illustrative purposes only, and are not intended to limit the protection scope of the present disclosure.

The term "streaming," as used herein, refers to a continuous and real-time transmission of time-based media data (e.g., sound, images, or animations) from a sender (e.g., an audio-video server) to a receiver (e.g., a user computer). In streaming, the receiver does not have to wait until an entire data file is completely downloaded, but only needs to wait for a few seconds or tens of seconds for transmission, and may output the downloaded data after the downloaded data reaches a certain amount (for example, playing a received video stream on a display). Streaming plays an important role in network transmission. In 2020, 82% of the world's network transmission bandwidth was used for video streaming, and the proportion is still increasing with the adoption of new video applications such as remote augmented reality/virtual reality (AR/VR) and remote games.

The term "include" and its variants as used herein mean open-ended inclusion, i.e., "including but not limited to." The term "based on" is "based at least in part on." The term "one embodiment" means "at least one embodiment." The term "another embodiment" means "at least one further embodiment." Relevant definitions of other terms will be given in the description below.

In recent years, due to the rise of stream-based application platforms (such as video streaming services, remote games, conference calls, etc.) which have high requirements on network resources, network pressure is constantly increasing, and some streaming media platforms have to limit the quality of allowed transmission and output streams. Network bandwidth usage modes, on the other hand, have a strong seasonal effect. For example, short video services have a strong daily seasonality, and the network utilization fluctuates between saturation and underutilization over different periods of one day. Therefore, an adaptive balance mechanism is needed to adapt to a dynamic network environment during streaming.

Conventional streaming makes an adaptive balance between transmission qualities and network resources to ensure the continuity of streaming media. For example, in a video streaming platform, different transmission qualities (e.g., video resolution) may be automatically switched to adapt to network conditions (e.g., bandwidth conditions). When the bandwidth is limited, a sender will transmit a compressed lower-quality video stream to a receiver (e.g., a terminal device of a user) to save bandwidth, so as to ensure that the user has a continuous experience in streaming media. Since the applied compression technology (e.g., H.264) is static compression applied in advance (i.e., compression occurs before and cannot be changed without re-computation), computation requirements cannot be adjusted at runtime. Therefore, when a transmission quality of a stream is reduced, an output quality of the stream at the receiver is also reduced accordingly.

Technologies such as super-resolution may be used to compensate for quality degradation of streams. "Super-resolution" refers to constructing high-resolution data from given low-resolution data by means of models, algorithms, processing procedures, and other technical means. The term "super-resolution reconstruction" refers to restoring compressed data (media data such as video, images, and audio) to a high resolution (e.g., original resolution) by technical means. The super-resolution reconstruction is combined with conventional video compression for streaming, and for a compressed stream transmitted with a quality lower than an expected output quality, the quality of the stream is compensated at the receiver, so that an output quality of the content of the stream may be improved while reducing the bandwidth usage, but at the expense of additional computations.

While part of the computations that include training a model for reconstruction may be performed offline on a cloud or a data center, various resources at a receiver such as an edge or a user terminal are still required to reconstruct a received stream to compensate for quality degradation of the stream. As an example, a deep neural network (DNN) model for video reconstruction may be trained at a cloud. When a video is requested by an end user or a cache server, a sender transmits a low-quality stream of the video and a corresponding DNN model, and the DNN model is used to reconstruct the video. Additional resource consumption at a receiver is inevitably introduced, and a good output quality may be provided by DNN-based reconstruction, but computationally intensive methods may have very high resource requirements. For example, intensive computations in DNNs require specialized accelerators to match computational requirements, and the accelerators are very expensive compared with other hardware components. It is sometimes very expensive or difficult to support use cases (e.g., cloud games) with real-time or even super real-time requirements. Therefore, the use of receiver resources in streaming is not unlimited either.

In order to at least partially solve the above problems and other potential problems, an embodiment of the present disclosure provides a solution for streaming. The method takes resources of a receiver into account in addition to available network resources in an adaptive balance mechanism for streaming. During transmission of a stream, this solution determines at least a quality with which a stream should be transmitted based on resources of the receiver available for compensating for degradation of a transmission quality of the stream and network resources available for transmitting the stream. To some extent, this solution may be viewed as a balanced computation of receiver resources and network resource savings, which adaptively adjusts the transmission quality of the stream and optionally adjusts the quality of content of the stream output from the receiver depending on current utilizations and available quantities of the two resources.

The solution according to the embodiment of the present disclosure is a supplement to conventional adaptive balancing based on transmission quality adjustment. This solution, in combination with a stream quality compensation technology, introduces resources of a receiver of a stream as a new dimension of flexibility, so that an operator of a stream platform can provide a series of more flexible choices to stream videos according to more different conditions. This solution may be used in combination with other network optimization technologies such as a content distribution network (CDN) that helps reduce seasonal effects by reducing repeated transmissions to further optimize utilization of various resources and user experience in streaming.

Figure 1:
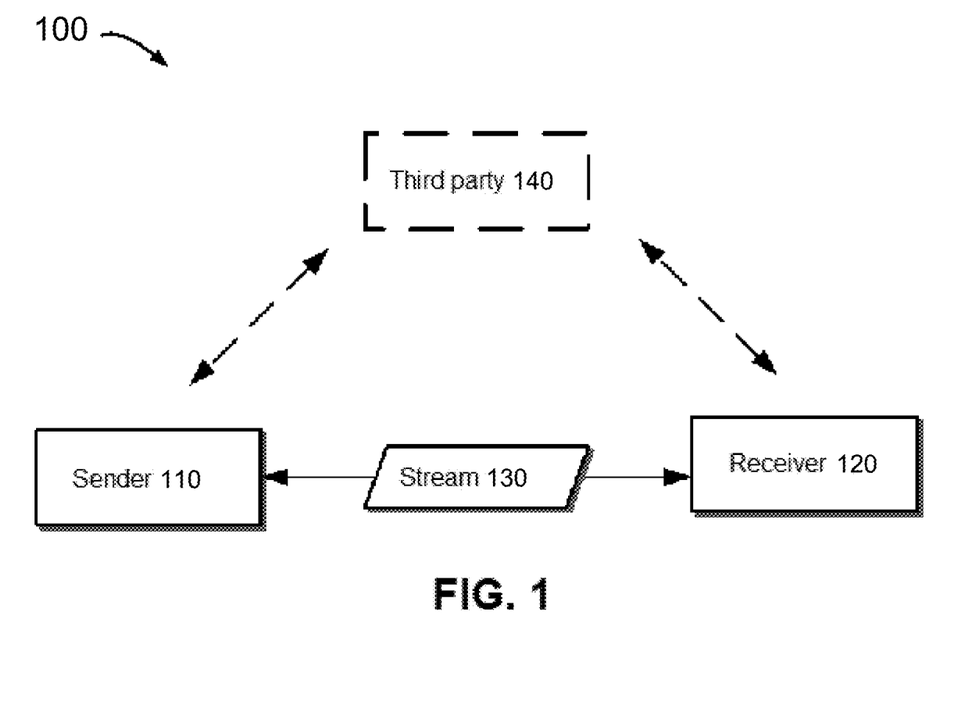
FIG. 1 shows a schematic diagram of an example environment in which some embodiments of the present disclosure may be implemented.

Illustrative embodiments of the present disclosure will be specifically described below with reference to the accompanying drawings. Advantages of the solution of the present disclosure will become more apparent from the detailed description. FIG. 1 shows a schematic diagram of example environment 100 in which a plurality of embodiments of the present disclosure can be implemented.

As shown in FIG. 1, example environment 100 includes sender 110 of stream 130 and receiver 120 of stream 130. Depending on a deployment scenario, for example, sender 110 may be a server of a streaming media platform, while receiver 120 may be a terminal device capable of playing streaming media, an edge device providing a network entry point for a terminal device, or a cache server closer to a user in a network than sender 110. Sender 110 and receiver 120 may also be any other fixed or mobile device capable of sending and receiving streams. In addition to sending and receiving stream 130, sender 110 and receiver 120 may also transfer other messages, data, etc. to each other.

There may also optionally be third party 140 in communication with sender 110 and receiver 120 in example environment 100. Third party 140 may be any suitable device capable of communicating with sender 110 and receiver 120. For example, third party 140 may be some control component or resource allocation component of a streaming media cloud platform.

Sender 110 may transmit stream 130 to receiver 120 based on, for example, a request of receiver 120. In some cases, a transmission quality of stream 130 may be increased or reduced during transmission due to dynamic changes in network conditions that may be used to transmit stream 130. In some cases, receiver 120 may use available computing and data resources thereof to compensate received stream 130 (e.g., super-resolution reconstruction of stream 130 of video content) to meet quality requirements for the content of stream 130 output from the receiver.

It should be understood that the architecture and functions of example environment 100 are described for illustrative purposes only, and do not imply any limitation to the scope of the present disclosure. Sender 110, receiver 120, or third party 140 may be a single device, a distributed device, or a device in any other suitable form. There may also be other devices, systems, or components that are not shown in example environment 100. The embodiments of the present disclosure may also be applied to other environments having different structures and/or functions.

Figure 2:
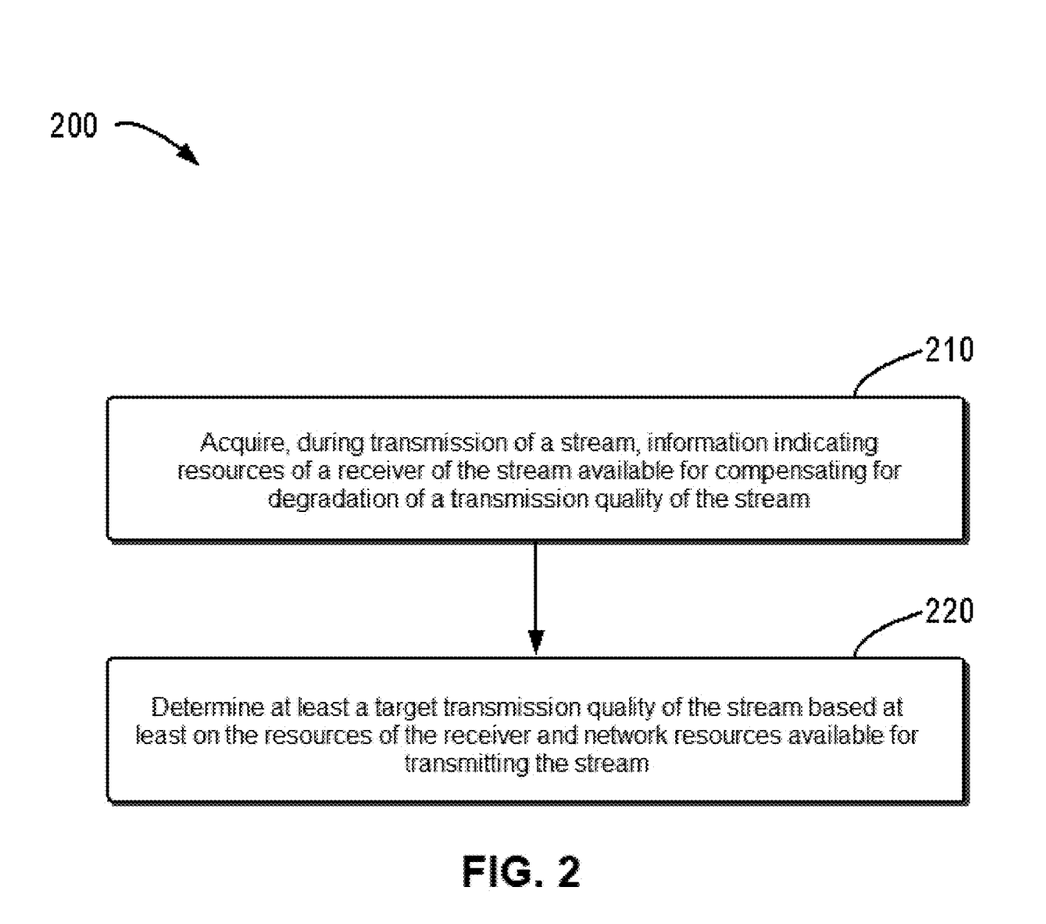
FIG. 2 shows a flow chart of a method for streaming according to some embodiments of the present disclosure.

FIG. 2 shows a flow chart of example method 200 for streaming according to some embodiments of the present disclosure. Example method 200 may be executed, for example, by any of sender 110, receiver 120, or third party 140 as shown in FIG. 1. It should be understood that method 200 may also include additional actions not shown, and the scope of the present disclosure is not limited in this regard. Method 200 will be described in detail below in combination with FIG. 1.

At block 210, during transmission of stream 130, information indicating resources of receiver 120 of stream 130 available for compensating for degradation of a transmission quality of stream 130 is acquired. In some embodiments, the information may include, for example, various indexes associated with a computing power of the receiver. For example, the information may include a quantized value and usage rate of the computing power of the receiver. For example, the information may also include the proportion of total computing power at the receiver that can be allocated to compensate the quality of stream 130. In some embodiments where a model is used to compensate stream 130 (for example, a model such as DNN is optionally used to reconstruct stream 130 of video content), the information may also include relevant parameters regarding the performance of the model used. Any other suitable information may also be acquired.

At block 220, a target transmission quality may be determined based at least on the resources of receiver 120 and network resources available for transmitting stream 130. The target transmission quality should be used when transmitting stream 130 to receiver 120. For example, the target transmission quality of stream 130 may be determined as an original quality thereof based on a network bandwidth that is greater than an original quality of uncompressed content of stream 130 at the sender and there are no resources at receiver 120 available for compensation.

In some embodiments, transmitted stream 130 should be output from receiver 120 with a specified output quality. The output quality may be specified by a user. In these embodiments, method 200 may further include acquiring a specified output quality of stream 130, and determining the target transmission quality of stream 130 based on the output quality, the resources of receiver 120, and the network resources available for transmitting stream 130. The output quality of stream 130 may be specified by a user in a variety of ways. For example, the output quality of stream 130 may be specified by the user by selecting an output quality option via an interface of an output device at receiver 120 (e.g., selecting a particular playing resolution on a video playing application interface). For example, the output quality of stream 130 may also be specified by the user by agreeing to a certain protocol (e.g., a particular user service level protocol).

In some embodiments, when the transmission quality of stream 130 supported by the network resources is lower than the specified output quality, the target transmission quality of stream 130 may be determined based on a transmission quality of stream 130 compensable by the resources of receiver 120. Taking a video stream that may be reconstructed using super-resolution as an example, the best resolution of stream 130 that can be supported by a current network bandwidth may be taken as a transmission resolution of stream 130 when the resources of receiver 120 are insufficient to compensate stream 130 of video content from the resolution at which transmission can be achieved by the network bandwidth in real time or approximately real time to the resolution specified by the user for playing. In this case, the content of stream 130 played at receiver 120 may be paused to wait for receiver 120 to reconstruct transmitted stream 130 to have a specified resolution.

In some embodiments, the target transmission quality of stream 130 may be determined in a manner that complies with the following constraints: resources of receiver 120 required for compensating stream 130 having the target transmission quality as having a specified output quality do not exceed the resources available at receiver 120; and network resources used for transmitting stream 130 with the target transmission quality do not exceed the available network resources. In some embodiments, a modeling method such as linear programming may be used to determine the target transmission quality of stream 130 while complying with the aforementioned constraints. As an example, the following transmission quality may be found as the target transmission quality of stream 130 while complying with the aforementioned constraints: transmitting stream 130 with the transmission quality makes operating costs of an operator of a transmission platform for transmitting stream 130 and compensating the transmitted stream as having a specified resolution be minimized. The scope of the present disclosure is not limited to the specific model or examples thereof used to determine the target transmission quality in the manner described above.

The above-described embodiments of the present disclosure allow a balance between using more receiver resources to save more network resources and using more network resources to save receiver resources, without adjusting the output quality at the receiver, thereby providing multiple choices to meet the same stream output quality requirement, so as to reduce disruption of stream output and optimize resource utilization while meeting the requirement.

Figure 3:
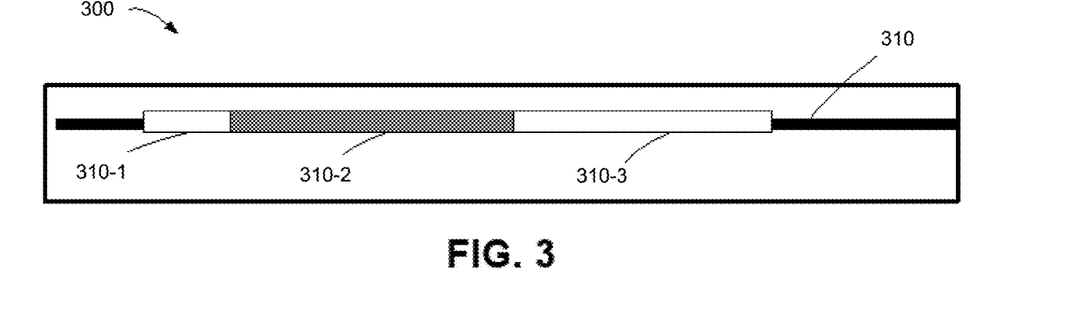
FIG. 3 shows a schematic diagram of a portion of an example output interface when a stream of a method according to one embodiment of the present disclosure is output on the example output interface at a receiver.

As an illustration, FIG. 3 shows a schematic diagram according to one embodiment of the present disclosure, in which portion 300 of an example output interface at a receiver where a stream is output when a user specifies an output quality of the stream is shown. For example, the example output interface may be a playing interface of a stream-based video player. For illustrative purposes, FIG. 3 will be discussed below in the context of playing of a video stream, with the resolution as a quality metric for the stream and the bandwidth as a metric for network resources. Here, the receiver may be receiver 120 in FIG. 1 and the video stream may be stream 130. Portion 300 will be described in detail below with reference to FIG. 1.

Portion 300 includes progress bar 310 as the video content of stream 130 is played on the example output interface at receiver 120. For purposes of description, segments 310-1, 310-2, and 310-3 of progress bar 310 are shown. Network conditions and resource conditions of receiver 120 change at an intersection of time periods corresponding to the segments. It should be understood that, while the content of stream 130 is being played, the network conditions and the resource conditions of receiver 120 may change more or less times, and may change differently.

During the time period corresponding to segment 310-1, a network connection is in good condition, stream 130 is transmitted to receiver 120 with a user-specified playing resolution, and receiver 120 plays received stream 130 in a playing interface with portion 300 without quality compensation (e.g., super-resolution reconstruction). At the beginning of the time period corresponding to segment 310-2, the bandwidth is reduced due to network congestion. With the method of the present disclosure, stream 130 is transmitted during the time period with another resolution lower than the user-specified playing resolution, and the receiver plays received stream 130 with the specified playing resolution after quality compensation. At the beginning of the time period corresponding to segment 310-3, the utilization of resources (e.g., computing resources of an edge server at the receiver) available at the receiver for quality compensation of stream 130 is saturated, and the network connection becomes good again. Thus, during this time period, stream 130 is transmitted again with the specified playing resolution and played directly. Throughout the process, the transmission resolution of stream 130 and the resources of the receiver for compensating stream 130 are dynamically adjusted so that the content of stream 130 played to the user remains with the user-specified resolution and freezing is avoided, thereby enhancing the user experience.

Referring again to FIG. 2, in other embodiments of the present disclosure, there may be no output quality of stream 130 at receiver 120, e.g., specified by the user. For example, a user at a receiver of a video stream may select a resolution of an automatic mode to allow dynamic adjustment of the resolution with which the video stream is played during playing. In this case, example method 200 may further include determining a target transmission quality of stream 130 and an output quality of output stream 130 at receiver 120 based on the resources of receiver 120 and the network resources available for transmitting stream 130.

In some embodiments, the target transmission quality of stream 130 and the output quality of output stream 130 at receiver 120 may be determined based on a comparison of quantities of the network resources and the resources of receiver 120 with corresponding thresholds. For example, based on that network resources required to transmit stream 130 with a certain quality fall within a certain threshold range, the quality may be taken as the target transmission quality of stream 130. For example, based on resources of receiver 120 required for compensating stream 130 transmitted with the determined target transmission quality to a certain output quality falling within a certain threshold range, the output quality may be taken as the output quality of stream 130 at receiver 120.

In some embodiments, the target transmission quality and the output quality of stream 130 at receiver 120 may be determined in a manner that complies with the following constraints: resources of receiver 120 required for compensating stream 130 having the target transmission quality as having the output quality do not exceed the resources available at receiver 120; and network resources used for transmitting stream 130 with the target transmission quality do not exceed the available network resources. In some embodiments, a modeling method such as linear programming may be used to determine the target transmission quality of stream 130 while complying with the aforementioned constraints. As an example, the following transmission quality and output quality complying with the aforementioned constraints may be found as the target transmission quality of stream 130 and the output quality of output stream 130 at receiver 120 respectively: transmitting stream 130 with the transmission quality and outputting stream 130 at receiver 120 with the output quality will make the operating costs of an operator of a streaming platform for transmitting stream 130 and compensating transmitted stream 130 be minimized. The scope of the present disclosure is not limited to the specific model or examples thereof used to determine the target transmission quality of stream 130 in the manner described above.

Together with the aforementioned and other embodiments of the present disclosure, embodiments of dynamically determining an output quality of a stream according to the method of the present disclosure may provide a more flexible streaming infrastructure platform framework. This is advantageous for both end users and service platforms. Users may obtain a higher-quality stream output, or even a "super-quality" stream output (e.g., a video stream with a resolution greater than a transmission resolution supported by a network bandwidth) with less network disruption. On the other hand, platforms may make a balance between computations and network bandwidths according to a use state of a transmission pipeline, and adaptively adjust a mode of providing a streaming service through more flexible additional options, so as to realize better overall resource utilization and lower operating costs.

Figure 4:
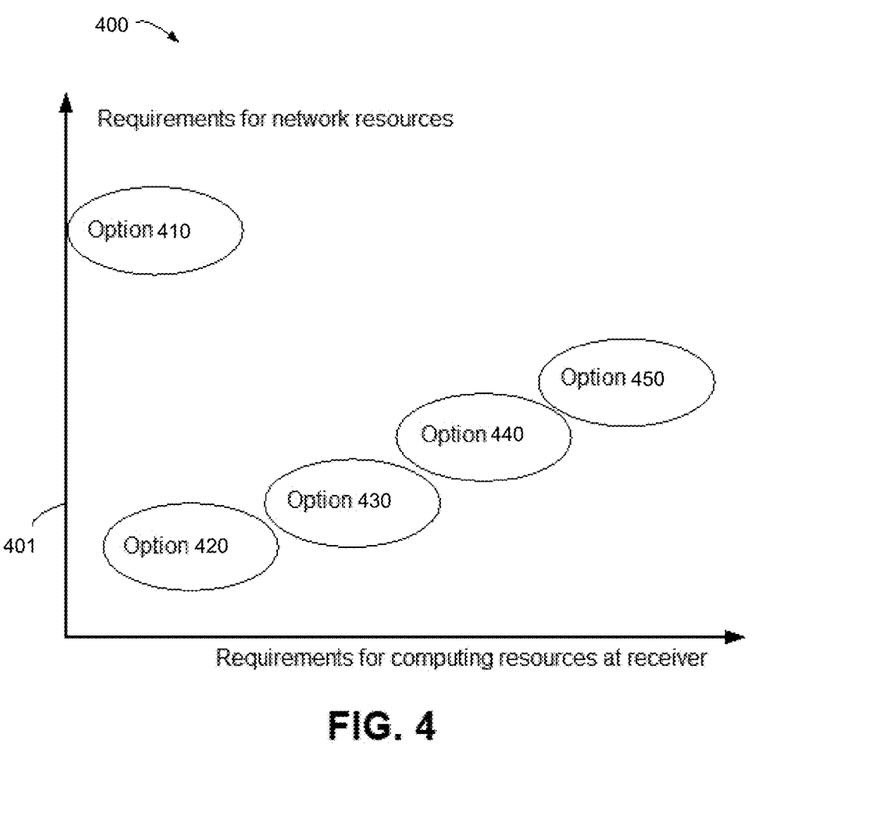
FIG. 4 shows a schematic chart of options for a transmission quality and an output quality of a stream determined according to one embodiment of the present disclosure.

As an illustration, FIG. 4 shows schematic chart 400 of sequencing. Chart 400 shows, in coordinate system 401, an example of streaming options that may be provided by a stream platform in a mode of dynamically adjusting an output quality according to one embodiment of the present disclosure. The stream platform may use these options to transmit stream 130 in FIG. 1 and output it at the receiver. Chart 400 is described below with reference to FIG. 1.

As shown in FIG. 4, a horizontal axis of coordinate system 401 indicates requirements for computing resources at a receiver to be consumed by using options, and a vertical axis of coordinate system 401 indicates requirements for network resources to be consumed by using the options. Positions of options 410-450 in coordinate system 401 are sequential, i.e., the positions indicate relative sizes between the options, not exact values.

When option 410 is used, the platform transmits stream 130 with a5 and outputs the stream at receiver 120 with a5, where these two instances of "a5" correspond to a particular transmission quality and a particular output quality, respectively. When option 420 is used, the platform transmits stream 130 with a1 and outputs the stream at receiver 120 with a5. When option 430 is used, the platform transmits stream 130 with a2 and outputs the stream at receiver 120 with a6. When option 440 is used, the platform transmits stream 130 with a3 and outputs the stream at receiver 120 with a7. When option 450 is used, the platform transmits stream 130 with a4 and outputs the stream at receiver 120 with a8. In these examples, a1-a8 correspond to transmission and/or output qualities, where $a1<a2<a3<a4<a5<a6<a7<a8$. As can be seen from chart 400, these options have different resource requirements. With the solution provided by the present disclosure, it can be determined which option should be used to provide stream 130 under real-time resource conditions based on network resources and resources of a receiver of the stream and using the method described in combination with the embodiments described above. For example, methods based on thresholds or planning under constraints as described in the embodiments described above may be used to determine which option to use. It should be understood that the options in FIG. 4 are merely examples and that more options, fewer options, and different options may also be provided for streaming.

Referring again to FIG. 2, as previously described, example method 200 may be executed by either sender 110 or receiver 120. When example method 200 is executed by sender 110, sender 110 may also transmit stream 130 to receiver 120 using the determined target transmission quality of stream 130.

When example method 200 is executed by receiver 120, receiver 120 may also send the determined target transmission quality of stream 130 to the sender of stream 130 and may receive stream 130 having the target transmission quality. In some embodiments, when the target transmission quality of stream 130 received by receiver 120 is lower than a specified output quality of stream 130, receiver 120 compensates stream 130 as having the specified output quality using resources thereof. In other embodiments, when the target transmission quality of stream 130 received by receiver 120 is lower than an output quality of stream 130 output from receiver 120 as determined based on the method of the present disclosure, receiver 120 compensates stream 130 as having the determined output quality using resources thereof.

Figure 5:
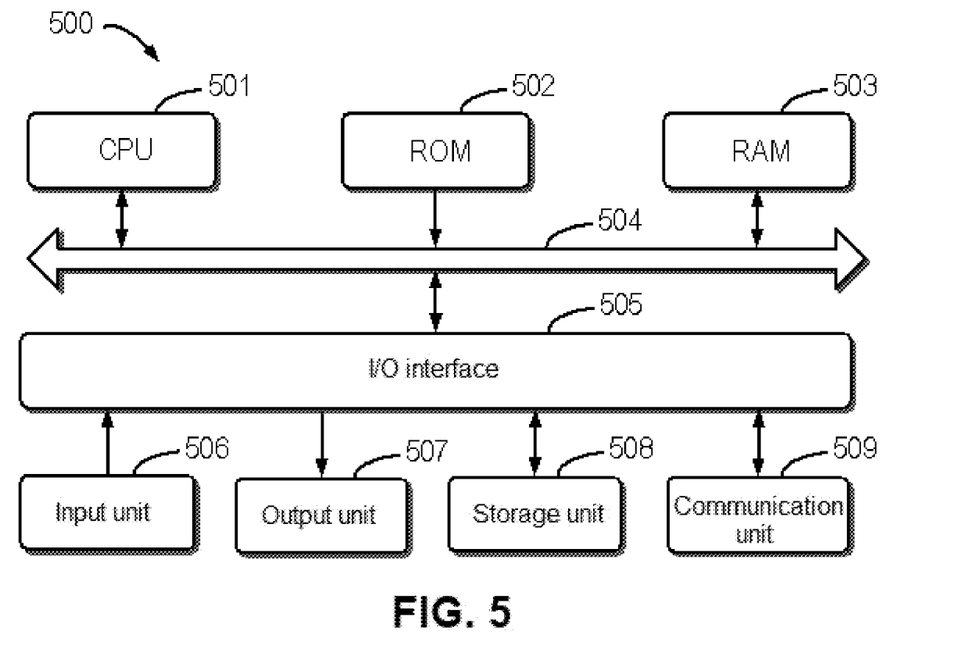
FIG. 5 shows a schematic block diagram of a device that may be used to implement embodiments of the present disclosure.

FIG. 5 shows a schematic block diagram of example device 500 that may be used to implement embodiments of the present disclosure. For example, receiver 120 as shown in FIG. 1 may be implemented by device 500. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for the operation of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

The various processes and processing described above, such as method 200, may be executed by CPU 501. For example, in some embodiments, method 200 may be implemented as computer software programs that are tangibly included in a machine-readable medium, such as storage unit 508. In some embodiments, part of or all the computer programs may be loaded and/or installed to device 500 via ROM 502 and/or communication unit 509. When the computer programs are loaded to RAM 503 and executed by CPU 501, one or more actions of method 200 described above may be executed.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semi-conductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Illustrative embodiments of the present disclosure have been described above. The above description is illustrative, rather than exhaustive, and is not limited to the disclosed various embodiments. Numerous modifications and alterations will be apparent to those of ordinary skill in the art without departing from the scope and spirit of the illustrative embodiments. The selection of terms used herein is intended to best explain the principles and practical applications of the various embodiments or the improvements to technologies on the market, and to otherwise enable persons of ordinary skill in the art to understand the embodiments disclosed here.

What is claimed is:

1. A method for streaming, comprising:
   acquiring, during transmission of a stream, information indicating computing resources of a receiver of the stream available for compensating for degradation of a transmission quality of the stream; and
   determining at least a target transmission quality of the stream based at least on the computing resources of the receiver and network resources available for transmitting the stream;
   wherein the information indicating computing resources of the receiver of the stream available for compensating for degradation of the transmission quality of the stream comprises at least information characterizing one or more available portions of computing power of the receiver of the stream; and
   wherein determining at least the target transmission quality for the stream comprises selecting between at least (i) a first transmission configuration that utilizes a first level of network resources to transmit the stream to the receiver and a first level of computing power of the receiver to compensate for degradation in quality of the transmitted stream, and (ii) a second transmission configuration that utilizes a second level of network resources, different than the first level of network resources, to transmit the stream to the receiver and a second level of computing power of the receiver, different than the first level of computing power of the receiver, to compensate for degradation in quality of the transmitted stream.

2. The method according to claim 1, wherein determining at least the target transmission quality comprises:
   acquiring an output quality of the stream specified by a user; and
   determining the target transmission quality based on the computing resources of the receiver, the network resources available for transmitting the stream, and the output quality specified by the user.

3. The method according to claim 2, wherein determining at least the target transmission quality comprises:
   determining, when a first potential transmission quality of the stream supported by the network resources is lower than the output quality specified by the user, the target transmission quality based on a second potential transmission quality of the stream compensable by the computing resources of the receiver.

4. The method according to claim 3, wherein determining at least the target transmission quality comprises:
   determining the target transmission quality in the following manner:
   that an amount of computing resources of the receiver required to compensate the target transmission quality of the stream to the output quality specified by the user does not exceed the computing resources available at the receiver; and
   that an amount of network resources required for transmitting the stream with the target transmission quality does not exceed the available network resources.

5. The method according to claim 2, wherein the method is executed at least in part by the receiver of the stream and further comprises:
   sending the determined target transmission quality of the stream to a sender of the stream;

receiving the stream having the target transmission quality; and compensating, when the target transmission quality of the received stream is lower than the output quality specified by the user, the stream as having the specified output quality by using the computing resources of the receiver.

6. The method according to claim 1, wherein determining at least the target transmission quality comprises:
determining the target transmission quality of the stream and an output quality of the stream output from the receiver based on the computing resources of the receiver and the network resources available for transmitting the stream.

7. The method according to claim 6, wherein determining the target transmission quality and the output quality comprises:
determining the target transmission quality and the output quality based on a comparison of quantities of the network resources and the computing resources of the receiver with corresponding thresholds.

8. The method according to claim 6, wherein determining the target transmission quality and the output quality comprises:
determining the target transmission quality and the output quality of the stream output from the receiver in the following manner:
that an amount of computing resources of the receiver required to compensate the target transmission quality of the stream to the output quality does not exceed the computing resources available at the receiver; and
that an amount of network resources required for transmitting the stream with the target transmission quality does not exceed the available network resources.

9. The method according to claim 6, wherein the method is executed at least in part by the receiver of the stream and further comprises:
sending the determined target transmission quality of the stream to a sender of the stream;
receiving the stream having the target transmission quality; and
compensating, when the target transmission quality of the received stream is lower than the output quality of the stream, the stream as having the output quality by using the computing resources of the receiver.

10. The method according to claim 1, wherein the method is executed at least in part by a sender of the stream and further comprises:
transmitting the stream by using the determined target transmission quality of the stream.

11. An electronic device, comprising:
a processor; and
a memory coupled to the processor, the memory having instructions stored therein that, when executed by the processor, cause the electronic device to perform actions comprising:
acquiring, during transmission of a stream, information indicating computing resources of a receiver of the stream available for compensating for degradation of a transmission quality of the stream; and
determining at least a target transmission quality of the stream based at least on the computing resources of the receiver and network resources available for transmitting the stream;
wherein the information indicating computing resources of the receiver of the stream available for compensating for degradation of the transmission quality of the stream comprises at least information characterizing one or more available portions of computing power of the receiver of the stream; and
wherein determining at least the target transmission quality for the stream comprises selecting between at least (i) a first transmission configuration that utilizes a first level of network resources to transmit the stream to the receiver and a first level of computing power of the receiver to compensate for degradation in quality of the transmitted stream, and (ii) a second transmission configuration that utilizes a second level of network resources, different than the first level of network resources, to transmit the stream to the receiver and a second level of computing power of the receiver, different than the first level of computing power of the receiver, to compensate for degradation in quality of the transmitted stream.

12. The electronic device according to claim 11, wherein determining at least the target transmission quality comprises:
acquiring an output quality of the stream specified by a user; and
determining the target transmission quality based on the computing resources of the receiver, the network resources available for transmitting the stream, and the output quality specified by the user.

13. The electronic device according to claim 12, wherein determining at least the target transmission quality comprises:
determining, when a first potential transmission quality of the stream supported by the network resources is lower than the output quality specified by the user, the target transmission quality based on a second potential transmission quality of the stream compensable by the computing resources of the receiver.

14. The electronic device according to claim 13, wherein determining at least the target transmission quality comprises:
determining the target transmission quality in the following manner:
that an amount of computing resources of the receiver required to compensate the target transmission quality of the stream to the output quality specified by the user does not exceed the computing resources available at the receiver; and
that an amount of network resources required for transmitting the stream with the target transmission quality does not exceed the available network resources.

15. The electronic device according to claim 12, wherein the electronic device comprises the receiver of the stream, and the actions further comprise:
sending the determined target transmission quality of the stream to a sender of the stream;
receiving the stream having the target transmission quality; and
compensating, when the target transmission quality of the received stream is lower than the output quality specified by the user, the stream as having the specified output quality by using the computing resources of the receiver.

16. The electronic device according to claim 11, wherein determining at least the target transmission quality comprises:
determining the target transmission quality of the stream and an output quality of the stream output from the receiver based on the computing resources of the receiver and the network resources available for transmitting the stream.

17. The electronic device according to claim 16, wherein determining the target transmission quality and the output quality comprises:
   determining the target transmission quality and the output quality based on a comparison of quantities of the network resources and the computing resources of the receiver with corresponding thresholds.

18. The electronic device according to claim 16, wherein determining the target transmission quality and the output quality comprises:
   determining the target transmission quality and the output quality of the stream output from the receiver in the following manner:
      that an amount of computing resources of the receiver required to compensate the target transmission quality of the stream to the output quality does not exceed the computing resources available at the receiver; and
      that an amount of network resources required for transmitting the stream with the target transmission quality does not exceed the available network resources.

19. The electronic device according to claim 16, wherein the electronic device comprises the receiver of the stream, and the actions further comprise:
   sending the determined target transmission quality of the stream to a sender of the stream;
   receiving the stream having the target transmission quality; and
   compensating, when the target transmission quality of the received stream is lower than the output quality of the stream, the stream as having the output quality by using the computing resources of the receiver.

20. A computer program product tangibly stored on a computer-readable medium and comprising machine-executable instructions that, when executed, cause a machine to execute a method for streaming, the method comprising:
   acquiring, during transmission of a stream, information indicating computing resources of a receiver of the stream available for compensating for degradation of a transmission quality of the stream; and
   determining at least a target transmission quality of the stream based at least on the computing resources of the receiver and network resources available for transmitting the stream;
   wherein the information indicating computing resources of the receiver of the stream available for compensating for degradation of the transmission quality of the stream comprises at least information characterizing one or more available portions of computing power of the receiver of the stream; and
   wherein determining at least the target transmission quality for the stream comprises selecting between at least (i) a first transmission configuration that utilizes a first level of network resources to transmit the stream to the receiver and a first level of computing power of the receiver to compensate for degradation in quality of the transmitted stream, and (ii) a second transmission configuration that utilizes a second level of network resources, different than the first level of network resources, to transmit the stream to the receiver and a second level of computing power of the receiver, different than the first level of computing power of the receiver, to compensate for degradation in quality of the transmitted stream.

* * * * *